US011170950B2

(12) United States Patent
Liang

(10) Patent No.: US 11,170,950 B2
(45) Date of Patent: Nov. 9, 2021

(54) KEYBOARD BACKLIGHT MODULE WITH LIGHT-GUIDE PATTERN, REFLECTOR PATTERN, AND APPLICATIONS THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Hsin-Chih Liang, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 32 days.

(21) Appl. No.: 16/904,276

(22) Filed: Jun. 17, 2020

(65) Prior Publication Data

US 2020/0401235 A1 Dec. 24, 2020

Related U.S. Application Data

(60) Provisional application No. 62/863,251, filed on Jun. 18, 2019.

(30) Foreign Application Priority Data

Jun. 8, 2020 (CN) .......................... 202010510100.4

(51) Int. Cl.
*G06F 3/02* (2006.01)
*H01H 3/12* (2006.01)
(Continued)

(52) U.S. Cl.
CPC ........... *H01H 3/125* (2013.01); *G02B 6/0036* (2013.01); *G02B 6/0055* (2013.01); *G06F 3/0202* (2013.01); *H01H 13/14* (2013.01); *H01H 13/704* (2013.01); *H01H 13/705* (2013.01); *H01H 13/7057* (2013.01);
(Continued)

(58) Field of Classification Search
CPC .. G02B 6/0036; G02B 6/0038; G02B 6/0055; G02B 6/0073; H01H 2203/052
See application file for complete search history.

(56) References Cited

U.S. PATENT DOCUMENTS 8,890,014 B1 * 11/2014 Chen .................... G02B 6/0041
200/314
2013/0134021 A1 * 5/2013 Chen ..................... H01H 13/83
200/5 A
(Continued)

*Primary Examiner* — Keith G. Delahoussaye
(74) *Attorney, Agent, or Firm* — Innovation Counsel LLP

(57) ABSTRACT

A keyboard backlight module includes a light guide plate, a reflector, a light-emitting device and a first microstructure. The light guide plate has an output surface, a light guide pattern and a bottom surface disposed on an opposite side of the output surface. The light guide pattern is arranged on at least one of the bottom surface and the output surface. The reflector has a reflecting surface facing the bottom surface. The light-emitting device is disposed on one side of the light guide plate and configured to provide an incident light to the reflecting surface. The first microstructure is disposed on the reflecting surface, at least partially overlaps with the light guide pattern, and is configured to transform the incident light into a first reflected light.

21 Claims, 10 Drawing Sheets

(51) Int. Cl.
*H01H 13/14* (2006.01)
*H01H 13/785* (2006.01)
*H01H 13/83* (2006.01)
*F21V 8/00* (2006.01)
*H01H 13/704* (2006.01)
*H01H 13/7057* (2006.01)
*H01H 13/705* (2006.01)

(52) U.S. Cl.
CPC .......... *H01H 13/785* (2013.01); *H01H 13/83* (2013.01); *G02B 6/0073* (2013.01); *H01H 2203/052* (2013.01); *H01H 2219/039* (2013.01); *H01H 2221/058* (2013.01); *H01H 2229/044* (2013.01)

(56) References Cited

U.S. PATENT DOCUMENTS

2014/0133182 A1* 5/2014 Yao .................. H01H 13/83
 362/623
2016/0225549 A1* 8/2016 Liu .................. G06F 3/0202

* cited by examiner

KEYBOARD BACKLIGHT MODULE WITH LIGHT-GUIDE PATTERN, REFLECTOR PATTERN, AND APPLICATIONS THEREOF

This application claims the benefits of U.S. provisional application Ser. No. 62/863,251, filed Jun. 18, 2019, and People's Republic of China application Serial No. 202010510100.4, filed Jun. 8, 2020, the subject matters of which are incorporated herein by reference.

BACKGROUND

Technical Field

The disclosure relates to a backlight module, and more particularly to a keyboard backlight module and a backlit keyboard applying the same.

Description of Background

An input device is often used as a communication medium between users and electronic devices. A common input device, such as a keyboard, includes a plurality of key switches arranged in a block. The users can access the electronic device to perform corresponding functions by pressing different key switches. In order to enable the human eye to clearly see the symbols on each key switch in a low-light environment, backlight module technology is introduced into the keyboard, in which light generated by a keyboard backlight module is project to the backside of each keycap of the keyboard; then a portion of the light passes through the keycaps and emits outwards resulting in a backlight effect, so that the users can clearly see the symbols on the key switches during operation.

SUMMARY

The object of the present disclosure is to provide a keyboard backlight module and a backlit keyboard applying the same to improve the light-emitting uniformity thereof.

One aspect of the present disclosure is to provide a keyboard backlight module, wherein the keyboard backlight module includes a light guide plate, a reflector, a light-emitting device and a first microstructure. The light guide plate has an output surface, a light guide pattern and a bottom surface disposed on an opposite side of the output surface. The light guide pattern is arranged on at least one of the bottom surface and the output surface. The reflector has a reflecting surface facing the bottom surface. The light-emitting device is disposed on one side of the light guide plate and configured to provide an incident light to the reflecting surface. The first microstructure is disposed on the reflecting surface, at least partially overlaps with the light guide pattern, wherein a first reflected light is formed by a portion of the incident light via the first microstructure.

In one embodiment of the present disclosure, the reflecting surface has a first region and a second region, the distance between the first region and the light-emitting element is smaller than the distance between the second region and the light-emitting element; and the portion of the first microstructure disposed in the first region has a configuration different from that of the portion of the first microstructure disposed in the second region.

In one embodiment of the present disclosure, the first microstructure is a light-absorbing feature, the reflecting surface has a first region and a second region with substantially equal areas, the first region is closer to the light-emitting device than the second region, and a first area occupied by a portion of the first microstructure disposed in the first region is larger than a second area occupied by another portion of the first microstructure disposed in the second region.

In one embodiment of the present disclosure, the first microstructure has at least one first reflective surface facing the light-emitting device, and the first reflective surface and the reflecting surface form a first angle less than or equal to 90°.

In one embodiment of the present disclosure, the reflecting surface has a first region and a second region with substantially equal areas, the first region is closer to the light-emitting device than the second region, there is a first number of the first reflective surfaces disposed in the first region and a second number of the first reflecting surfaces disposed in the second region, and the first number is smaller than the second number.

In one embodiment of the present disclosure, the keyboard backlight module further includes a second microstructure configured to transform the incident light into a second reflected light, wherein the reflecting surface has a first region and a second region with substantially equal areas; the first region is closer to the light-emitting device than the second region; the first microstructure is disposed in the first region and the second microstructure is disposed in the second region; the second microstructure has at least one second reflective surface facing the light-emitting device, and the second reflective surface and the reflecting surface form a second angle smaller than the first angle.

In one embodiment of the present disclosure, the keyboard backlight module further includes a second microstructure configured to transform the incident light into a second reflected light, wherein the reflecting surface has a first region and a second region with substantially equal areas; the first region is closer to the light-emitting device than the second region; the first microstructure is disposed in the first region and has a first light-shielding area; and the second microstructure is disposed in the second region and has a second light-shielding area smaller than the first light-shielding area.

In one embodiment of the present disclosure, the light guide pattern has a first number of at least one light-guiding dot corresponding to the first region and a second number of at least one light-guiding dot corresponding to the second region, and the first number is smaller than the second number.

In one embodiment of the present disclosure, the first microstructure includes at least one protruding portion convexly protruding outwards from the reflecting surface, or at least one concave portion concavely recessed inwards to the reflector from the reflecting surface.

In one embodiment of the present disclosure, the keyboard backlight module further includes at least one light-absorbing material at least partially overlapping the protruding portion or the concave portion.

In one embodiment of the present disclosure, the light guide pattern has at least one light-guiding dot; and a single unit of the first microstructure has an area larger than an area of a single unit of the light-guiding dot.

Another aspect of the present disclosure is to provide a backlit keyboard, wherein the backlit keyboard includes a key switch module having at least one key switch and the keyboard backlight module as described above. The key switch module of the backlit keyboard is disposed on one side of the keyboard backlight module.

In one embodiment of the present disclosure, a portion of the light guide pattern and a portion of the first microstructure are correspondingly arranged below the at least one key switch.

In accordance with the embodiments of the present disclosure, a keyboard backlight module and a backlit keyboard applying the same are provided, wherein the keyboard backlight module includes a light guide, a reflector and at least one light-emitting device. It is characterized in that at least one microstructure is formed on a reflecting surface of the reflector to make it at least partially overlapping with a light guide pattern disposed on the light guide plate. A portion of the light that is provided by the light-emitting device, passing through the light guide plate and projected to the reflecting surface are lock and absorbed, or changed in the reflection direction by the microstructure, such that the intensity of the reflected light that comes from different regions of the reflecting surface can be adjusted, meanwhile the intensity of backlight that exits through different positions on the output surface of the light guide plate can be changed.

In one embodiment of the present disclosure, the reflecting surface of the reflector can be divided into a first region and a second region with substantially equal areas, and a first microstructure and a second microstructure with different sizes, patterns, materials, colors or structures are formed on these two regions respectively. The incident light emitted by the light-emitting device can be reflected by the first region and the second region to obtain two different kinds of reflected light having different intensities respectively passing through different regions of the output surface of the light guide plate. Thus, after these two different kinds of reflected light mixing with other light emitted from the output surface of the light guide plate, the uneven light emission phenomenon of the light guide plate both occurring on the region (corresponding to the first region) close to the light-emitting device and on the region (corresponding to the second region) far from the light-emitting device can be effectively neutralized. Whereby, the backlight uniformity of the keyboard backlight module can be significantly improved.

In one embodiment of the present disclosure, the first microstructure and the second microstructure may be a light-absorbing feature, and the area covered by the first microstructure is larger than the area covered by the second microstructure. In one embodiment of the present disclosure, the first microstructure and the second microstructure respectively have a reflective surface that can form a first angle and a second angle both less than or equal to 90° with the reflecting surface. Two different kinds of reflected light can be obtained when an incident light is respectively reflected with the first angle and the second angle; and these two different kinds of reflected light have lower intensity when they pass through the output surface of the light guide plate. By applying the above embodiments, the uneven light emission phenomenon of the light guide plate both occurring on the region close to the light-emitting device and on the region far from the light-emitting device can be effectively neutralized; the optical design of the keyboard backlight module can be optimized, and the light emitting uniformity of the keyboard backlight module can be increased. Whereby, the display effect of the backlit keyboard applying the above keyboard backlight module can be improved.

The above objects and advantages of the present disclosure will become more readily apparent to those ordinarily skilled in the art after reviewing the following detailed description and accompanying drawings, in which:

DETAILED DESCRIPTION

Figure 1A:
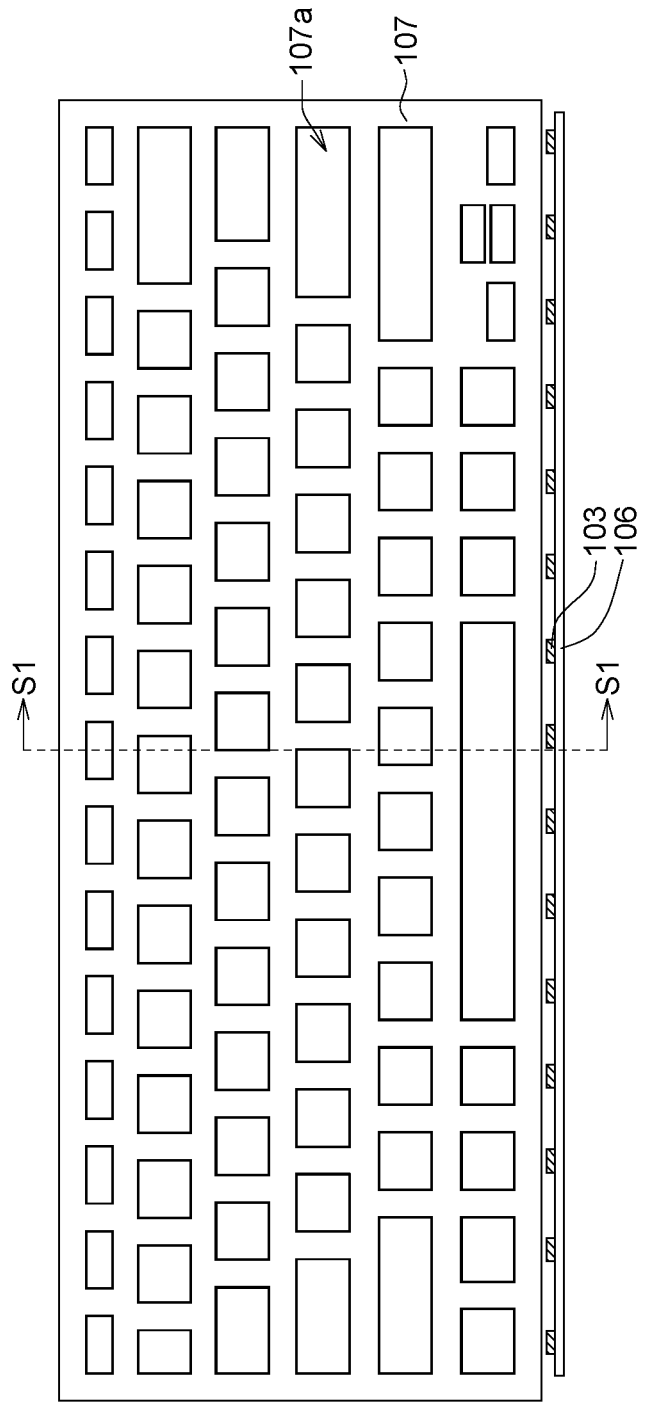
FIG. 1A is a top view illustrating the structure of a keyboard backlight module according to one embodiment of the present disclosure.

The embodiments as illustrated below provide a keyboard backlight module and a backlit keyboard applying the same, which can improve the light emitting uniformity of the keyboard backlight module. The present disclosure will now be described more specifically with reference to the following embodiments illustrating the structure and arrangements thereof.

It is to be noted that the following descriptions of preferred embodiments of this disclosure are presented herein for purpose of illustration and description only. It is not intended to be exhaustive or to be limited to the precise form disclosed. Also, it is important to point out that there may be other features, elements, steps, and parameters for implementing the embodiments of the present disclosure which are not specifically illustrated. Thus, the descriptions and the drawings are to be regard as an illustrative sense rather than a restrictive sense. Various modifications and similar arrangements may be provided by the persons skilled in the art within the spirit and scope of the present disclosure. In addition, the illustrations may not be necessarily drawn to scale, and the identical elements of the embodiments are designated with the same reference numerals.

Figure 1B:
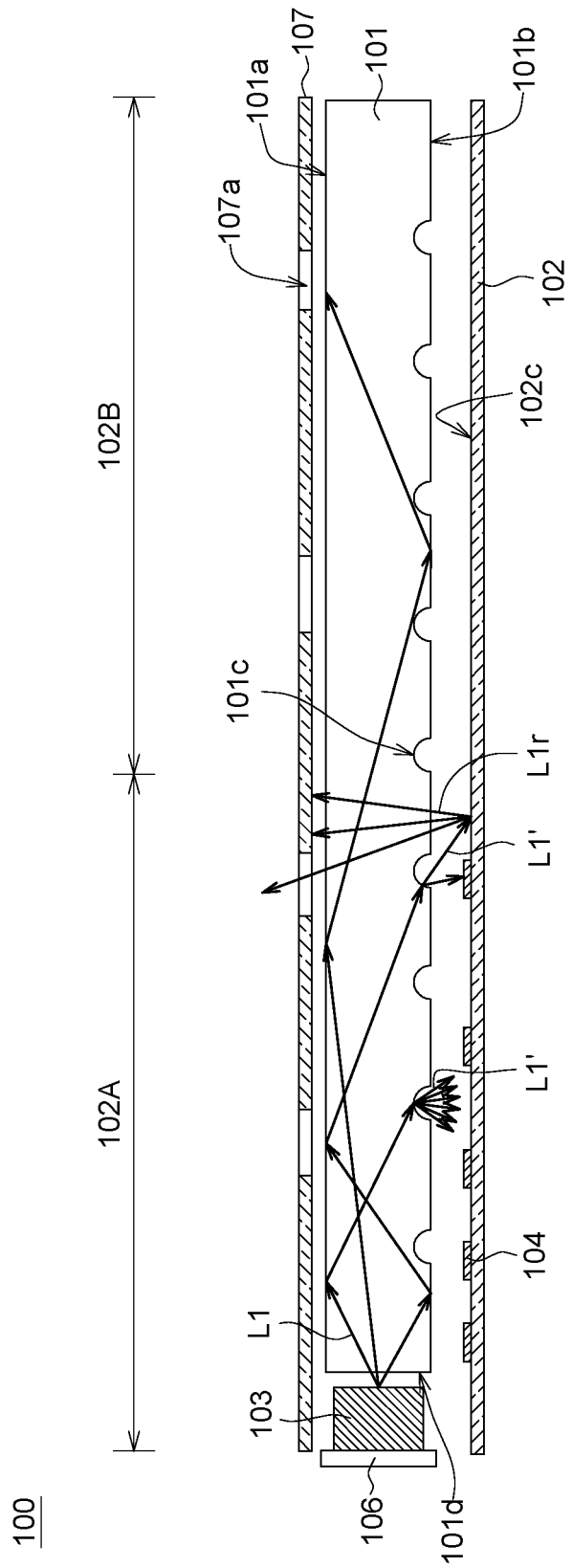
FIG. 1B is a cross-sectional view of the keyboard backlight module take along the cutting line S1 depicted in FIG. 1A.

FIG. 1A is a top view illustrating the structure of a keyboard backlight module 100 according to one embodiment of the present disclosure; and FIG. 1B is a cross-sectional view of the keyboard backlight module 100 take along the cutting line S1 depicted in FIG. 1A. The keyboard backlight module 100 includes a light guide plate 101, a reflector 102, at least one light-emitting device 103, at least one microstructure 104, and a light-shielding layer 107.

The light guide plate 101 has an output surface 101a and a bottom surface 101b disposed on an opposite side of the output surface 101a. In some embodiments of the present disclosure, the light guide plate 101 may be an optical sheet made of an optical material with high reflectivity that does not absorb light, such as polymethyl methacrylate (PMMA), polycarbonate (PC), or cyclo-olefin polymer (COP). And the light guide plate 101 may include a light guide pattern protruding upwards or recessed inwards from the bottom surface 101b or the light-emitting surface 101a or both using a screen-printing technology. For example, in some embodiments of the present disclosure, the light guide pattern may include a plurality of light-guiding dots 101c that are circular, square, triangular, polygonal, or other shapes. In one embodiment, the light-guiding points 101c of the light guide plate 101 can be formed by a continuous roll to roll fabrication process, in which a plurality of light scattering dots and/or V-cutting pattern may be directly pressed to imprint on the light guide plate 101, when the material is hot pressed for forming the light guide plate 101. Since the continuous roll to roll fabrication process has technical limits on size shrinkage and pattern complexity, thus the light guide pattern corresponding to different key switches may be designed, for example, as having a plurality of light guide dots 101c with the same pitch.

The incident light L1 emitted by the light-emitting device 103 propagates inside the light guide plate 101 by total internal reflection of light. When the incident light L1 is projected onto light-guiding dots 101c, the conditions of refraction can no longer be satisfied, thereby lights diffused to various angles may be generated and then pass through the output surface 101a to form the backlight of the keyboard backlight module 100. Wherein a portion of the incident light L1' diffused downward through the bottom surface 101b of the light guide plate 101 will be reflected by the reflector 102 to form the reflected light L1r returning to the light guide plate 101, and then exiting through the output surface 101a to form a portion of the backlight projecting to the keyboard backlight module 100.

The light-shielding layer 107 is disposed outside the light-emitting surface 101a of the light guide plate 101, and includes a patterned light-shielding portion, such as a black matrix, and a plurality of light-transmitting portions 107a that allows the light that passes through the light-emitting surface 101a projecting outwards from define the predetermined positions. Each of the light-transmitting portions 107a can be arranged corresponding to a key switch to make the light selectively passing through the light-transmitting portion 107a projecting to the backside of the corresponding key switch and to shield the positions where do not require light (such as the positions between two adjacent key switches) to avoid light leakage. In the present embodiment, the light-shielding layer 107 may include a transparent or white substrate (not shown) that can transmit light, a patterned white reflective layer (not shown) coated on the substrate, and a black matrix (not shown), wherein the white reflective layer is disposed, for example, on the side (the lower side of the substrate) facing the output surface 101a of the light guide plate 101, and the black matrix is located, for example, on the opposite side (upper side of the substrate) of the patterned white reflective layer.

The reflector 102 is disposed below the light guide plate 101 and has a reflecting surface 102c facing the bottom surface 101b, which can reflect the incident light L1' diffused downward through the bottom surface 101b of the light guide plate 101 to form the reflected lights L1r retuning back to the light guide plate 101. In some embodiments of the present disclosure, the material constituting the reflector 102 may include polyethylene terephthalate (PET). Alternatively, the reflector 102 may be made by a polyethylene terephthalate-based substrate coated with other higher reflectivity materials (such as metal) on the reflecting surface 102c by performing a post-treatment. The reflector 102 generally has a reflectivity greater than 95%.

The light-emitting device 103 is disposed on a circuit layer 106 and located on one side of the light guide plate 101. In some embodiments of the present disclosure, the light-emitting device 103 may be a light emitting diode (LED) device that can emit red colored light (R), green colored light (G), or blue colored light (B); or a LED device that can emit white light. In the present embodiment, the circuit layer 106 that has a plurality of light-emitting devices 103 disposed thereon is located one side of the light guide plate 101 and adjacent to a sidewall 101d of the light guide plate 101. Wherein, the sidewall 101d of the light guide plate 101 is perpendicular to and connected to (but not limited thereto) both the output surface 101a and the bottom surface 101b. In one embodiment, the circuit layer 106 can be a flexible circuit board disposed under the light-shielding layer 107, and the light-emitting devices 103 electrically connected to the flexible circuit board can pass through the light-shielding layer 107 to be adjacent to the sidewall 101d of the light guide plate 101, so that the light emitted by the light-emitting devices 103 can come into the light guide plate 101 from the sidewall 101d. In another embodiment, the light guide plate 101 may alternatively have an opening (not shown) formed on the sidewall 101d, the inner sidewall of the opening may serve as the light incident surface, and one of the light-emitting devices 103 is disposed in the opening of the light guide plate 101, so that the light emitted by the light-emitting device 103 can come into the light guide plate 101 from the inner side wall of the opening. In other words, the light incident surface of the light guide plate 101 may be, for example, located on the vertical sidewall 101d of the light guide plate 101 or the inner wall of the opening formed on the vertical sidewall 101d.

In recent years, as the light guide plate 101 becomes thinner, the diffusion effect (total internal reflection) of the light guide plate 101 becomes worse. Therefore, more diffused light usually passes through the region of the output surface 101a, close to the light-emitting device 103, which causes the problem of uneven light output (emission). In some embodiments of the present disclosure, by adjusting the number or area ratio of the light-guiding dots 101c in different regions of the bottom surface 101b of the light guide plate 101, the intensity of the backlight emitted outward from the region close to the light-emitting devices 103 can be reduced after the diffusion light L1 passing through the output surface 101a. However, due to the technical limitation in the process accuracy and size shrinkage of the light-guiding dots 101c, the problem of uneven light output of the keyboard backlight module 100 cannot be completely solved by adjusting the number or area ratio of the light-guiding dots 101c.

In some embodiments of the present disclosure, the problem of uneven light output of the keyboard backlight module 100 can be further improved by providing a plurality of microstructures 104 on the reflecting surface 102c of the reflector 102. For example, in the present embodiment, the microstructures 104 can be a light-absorbing feature covering the reflecting surface 102c of the reflector 102 and overlapping at least a portion of the light-guiding dots 101c of the light guide plate 101, and can be used to block or absorb a portion of the incident light L1' that diffuses downward and passes through the bottom surface 101b of the light guide plate 101. Such that, the portion of the incident light L1r reflected by the reflector 102 and returning to the light guide plate 101 can be reduced.

The reflector 102 has a first region 102A and a second region 102B, wherein the first region 102A is relatively close to the light-emitting devices 103. The distance between the first region 102A and the light-emitting devices 103 is smaller than the distance between the second region 102B and the light-emitting devices 103. Therefore, under the condition without applying the microstructure 104, the keyboard backlight module 100 may have a light output corresponding to the first region 102A with a stronger intensity than that corresponding to the second region 102B. In other words, the problem of uneven light output from the keyboard backlight module 100 can be improved by adjusting the distribution density of the microstructures 104 in different regions of the reflecting surface 102c of the reflector 102 (corresponding to different regions of the bottom surface 101b of the light guide plate 101). For example, larger number and denser microstructures 104 are provided in the first region 102A of the reflecting surface 102c of the reflector 102 near the light-emitting devices 103, and less and sparse microstructures 104 are provided in the second region 102B of the reflecting surface 102c of the reflector 102 far from the light-emitting devices 103 (as shown in FIG. 1B).

In one embodiment of the present disclosure, the areas of the first region 102A and the second region 102B are equal, and the area of the first region 102A covered by the microstructures 104 is larger than the area of the second region 102B covered by the microstructures 104. In another embodiment of the present disclosure, the densities of the microstructures 104 in the first region 102A and the second region 102B are exactly opposite to the numbers or area ratios of the light-guiding dots 101c arranged in different regions of the bottom surface 101b of the light guide plate 101 that are corresponding to the first region 102A and the second region 102B respectively. In other words, the number of light-guiding dots 101c disposed on the region of the bottom surface 101b corresponding to the first regions 102A is smaller than the number of light-guiding dots 101c disposed on the region of the bottom surface 101b corresponding to the second regions 102B. In the present embodiment, there may not have any microstructure 104 formed in the second region 102S of the reflecting surface 102c of the reflector 102 far away from the light-emitting devices 103.

In addition, the shape of the microstructures 104 is not limited. On a top view of the microstructures 104, the shape of the microstructures 104 may be circular, square, triangular, polygonal, circular, or various patterns with regular or irregular arc sides; and one single unit of the microstructures 104 may have an area larger than that of one single unit of the light-guiding dots 101c. The material constituting the microstructure 104 is not limited, and any material that can prevent reflection or absorption of light does not exceed the spiritual scope of the material. For example, in some embodiments of the present disclosure, the microstructure 104 may be made of a black opaque material or a semi-transparent material with single or multiple gray levels, such as printing ink.

It should be appreciated that adjusting the distribution density of the microstructures 104 in different regions of the reflecting surface 102c of the reflector 102 does not limit to use the distance to the light-emitting devices 103 as a reference standard. It is also not limited to use the coverage ratio of the microstructures 104 to reflecting surface 102c of the reflector 102 as a reference to adjust the light uniformity of the key backlight module 100. Those with ordinary knowledge in the art can adjust the distribution density, shape, area or light absorption characteristics of the microstructures 104 disposed in different regions of the reflecting surface 102c of the reflector 102 (or other factors that can affect the reflective characteristics of the microstructures 104) according to any parameters that affect the light uniformity of the keyboard backlight module 100 to solve the problem of uneven light output of the keyboard backlight module 100.

Figure 2A:
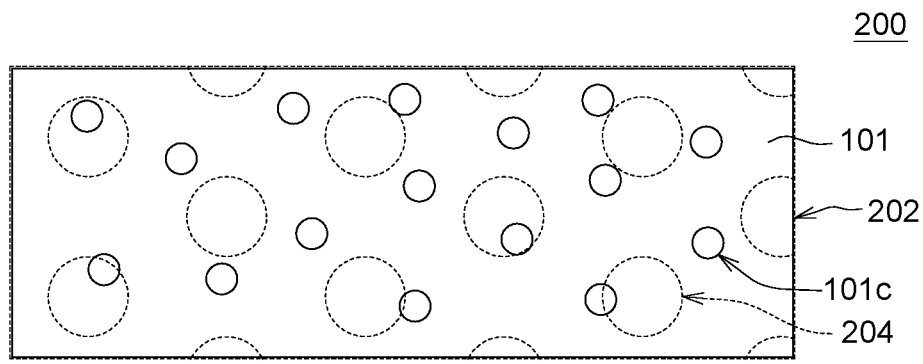
FIGS. 2A-2C are top views illustrating partial structures of a plurality of keyboard backlight modules according to some embodiments of the present disclosure.
Figure 2B:
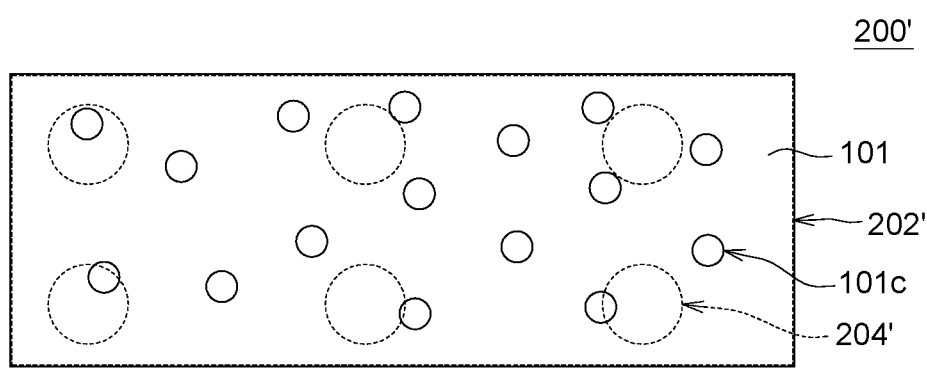
Figure 2C:
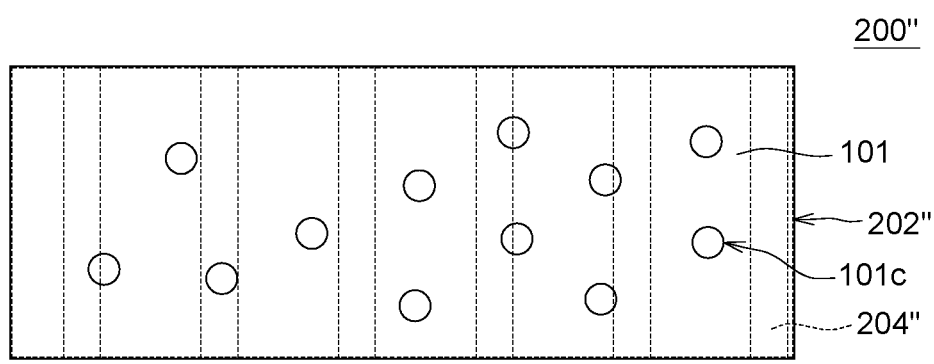

FIGS. 2A-2C are top views illustrating partial structures of a plurality of keyboard backlight modules 200, 200' and 200" according to some embodiments of the present disclosure. For the purpose of clear description, the light-shielding layer 107 and the light-emitting devices 103 are omitted, and only the arrangement and distribution of the microstructures 204 on the reflector 202 and their relative positions with the light-guiding dots 101c of the light guide plate 101 are shown.

As shown in FIG. 2A, both the microstructures 204 and the light-guiding dots 101c may be circular, and the number and density of the microstructure 204 and the light-guiding dots 101c may be approximately the same. The structure of the keyboard backlight module 200' shown in FIG. 2B is substantially similar as that of the keyboard backlight module 200 shown in FIG. 2A, the main difference is that the distribution density of the microstructures 204' disposed on the reflector 202' is smaller than the distribution density of the light-guiding dots 101c. In addition, the shape of the microstructure 204" is not limited to a circle. As shown in FIG. 2C, the microstructure 204" disposed on the reflector 202" may be elongated.

Figure 3:
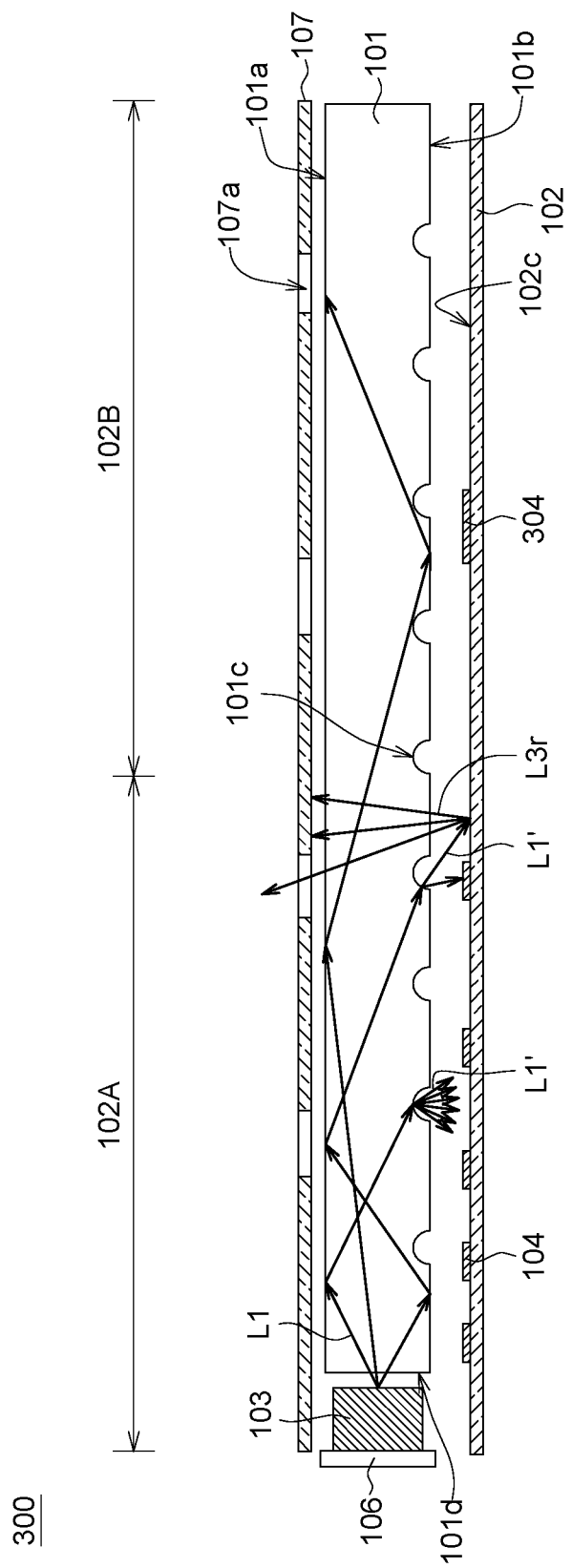
FIG. 3 is a cross-sectional view illustrating the structure a keyboard backlight module according to another embodiment of the present disclosure.

FIG. 3 is a cross-sectional view illustrating the structure a keyboard backlight module 300 according to another embodiment of the present disclosure. The structure of the keyboard backlight module 300 is substantially similar as that of the keyboard backlight module 100 as shown in FIG. 1B, the main difference is that the keyboard backlight module 300 further includes another microstructure 304 disposed on the reflecting surface 102c of the reflector 102. In the present embodiment, the microstructures 304 and the microstructures 104 are both light-absorbing features. The only difference therebetween is that a single unit of the microstructures 304 has an area different from that of a single unit of the microstructures 104, and these two have different distribution densities. The microstructure 304 is disposed in the second region 102B away from the light-emitting devices 103, and a single microstructure 304 has an area larger than that of a single microstructure 104. The area of the first region 102A occupied (overlapped) by the microstructure 104 is substantially larger than the area of the second region 102B occupied by the microstructure 304. In other words, the density of the microstructures 104 disposed in the first region 102A is significantly greater than the density of microstructures 304 with different sizes disposed in the second region 102B. By disposing different microstructures 104 and 304 on the reflecting surface 102c of the reflector 102, the uneven light output of the keyboard backlight module 300 can be further improved.

However, it should be appreciated that the shape, size, number, and pattern distribution of the microstructure 104 and 304 are not limited thereto. Any of the light-shielding/light-absorbing structures that meet the requirements for solving the problems of uneven light output does not exceed the spirit of the microstructures 104 and 304 described in the present disclosure. Those with skilled in the art can arbitrarily adjust the shape, size, color, material or graphic distribution of the microstructures 104 and 304 according to the design requirements of the keyboard backlight module 300.

After the incident light L1 emitted by the light-emitting devices passes through the bottom surface 101b of the light guide plate 101, a portion of the incident light L1 may be partially blocked or absorbed by the microstructures 104 and 304, thus merely a remaining portion of the incident light L1' can be reflected by the reflector 102 to return the light guide plate 101. By the blocking or absorption of the microstructure 104 and 304, a portion of the incident light L1' diffused downward through the bottom surface 101b of the light guide plate 101 can be prevented from being reflected by the first region 102A and the second region 102B of the reflecting surfaces 102c to form the reflected light L3r, such that the backlight passing through the output surface 101a of the light guide plate 101 to exit outward can be reduced. The intensity of the backlight respectively emitted outward from the regions of the output surface 101a corresponding to the first region 102A and the second region 102B can be reduced. However, because the area of the microstructure 104 shielding the first region 102A is larger than the area of the microstructure 304 shielding the second region 102B, the intensity of the backlight emitted from the region of the output surface 101a of the light guide plate 101 corresponding to the first region 102A is less than that of the backlight emitted from the region of the output surface 101a corresponding to the second region 102B. Therefore, the problem of uneven light output (emission) of the keyboard backlight module 300 can be improved.

Figure 4A:
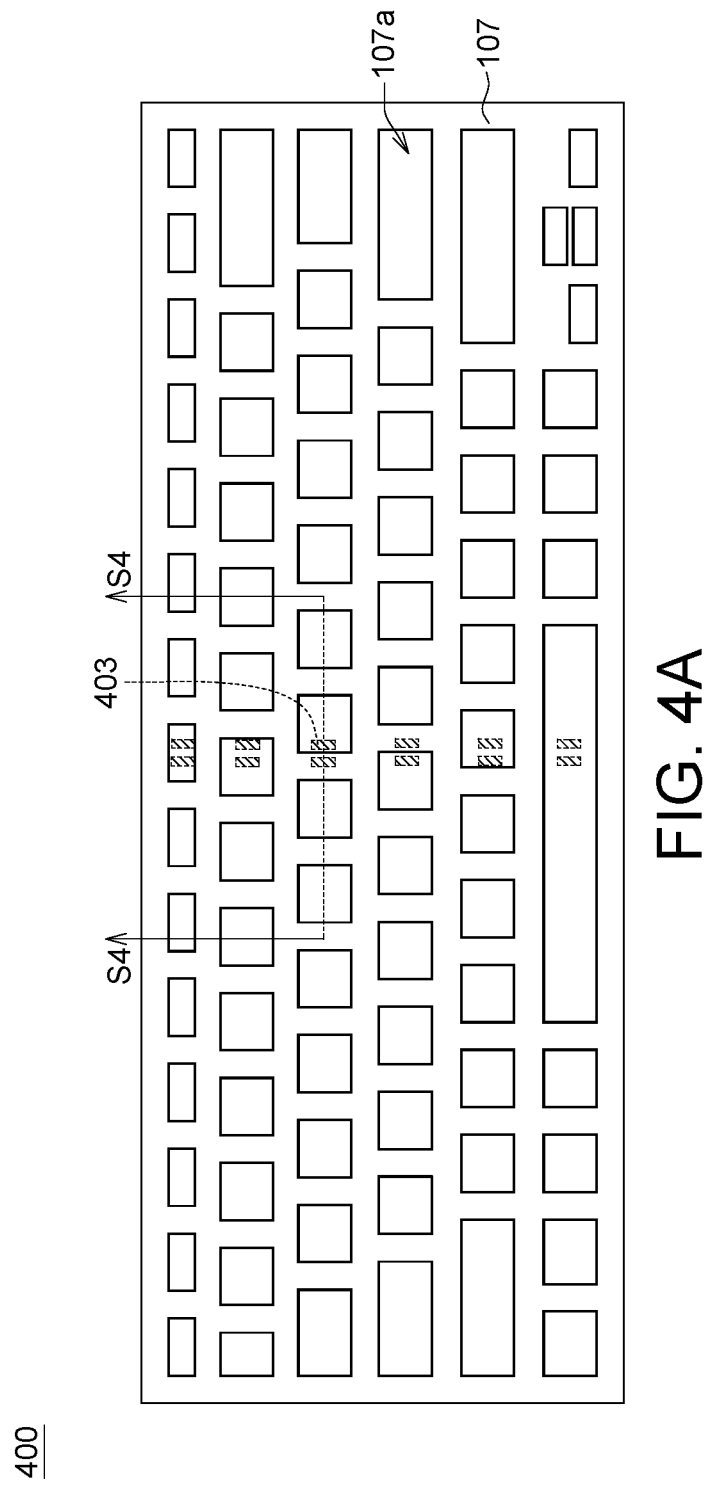
FIG. 4A is a top view illustrating the structure of a keyboard backlight module according to yet another embodiment of the present disclosure.
Figure 4B:
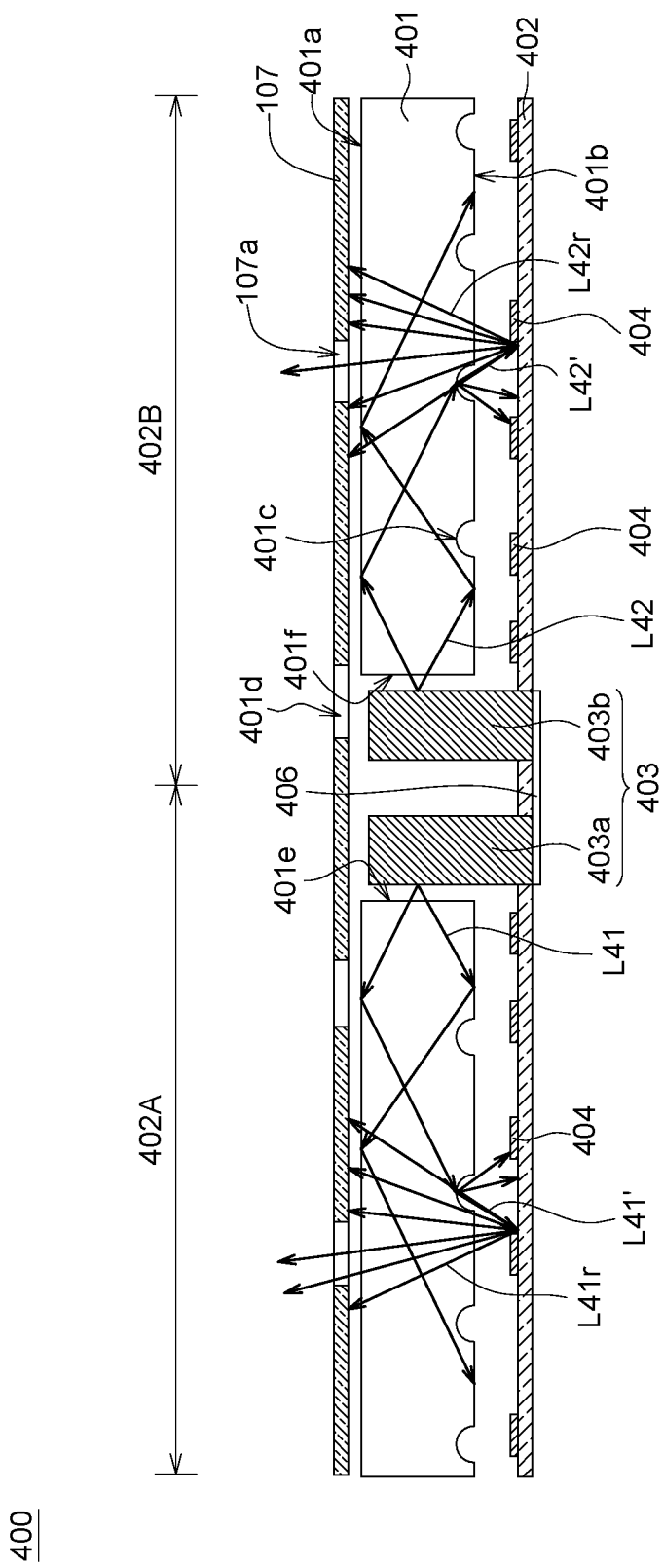
FIG. 4B is a cross-sectional view of the keyboard backlight module take along the cutting line S4 depicted in FIG. 4A.

FIG. 4A is a top view illustrating the structure of a keyboard backlight module 400 according to yet another embodiment of the present disclosure; and FIG. 4B is a cross-sectional view of the keyboard backlight module 400 take along the cutting line S4 depicted in FIG. 4A. The structure of the keyboard backlight module 400 is substantially similar as that of the keyboard backlight module 100, except that the keyboard backlight module 400 has a different arrangement in the light-emitting devices 403. In the present embodiment, the keyboard backlight module 400 includes a light guide plate 401, a reflector 102, a plurality of light-emitting devices 403, and a microstructure 404.

The plurality of light-emitting devices 403 are disposed on a circuit layer 406 and penetrate through the light guide plate 401. In detail, the light guide plate 401 has at least one opening 401d penetrating through the output surface 401a and the bottom surface 401b; at least one of the plurality of light-emitting devices 403 (e.g. light-emitting devices 403a and 403b) has on end connecting to the wiring of the circuit layer 406 and the other end extending into the opening 401d.

The plurality of light-emitting devices 403 are, for example, disposed at the relatively center of the keyboard backlight module 400, and the light emitted by the light-emitting devices 403a and 403b respectively propagates to the opposite sides of the keyboard backlight module 400 in the longitudinal direction. The incident light L41 emitted by the light-emitting device 403a can come into the light guide plate 401 through the sidewall 401e of the opening 401d and propagate inside the light guide plate 401 by total internal reflection. When the incident light L41 is projected to each of the light-guiding dots 401c, the conditions of refraction can no longer be satisfied, thereby the incident light L41 cab be diffused to various angles. Wherein, a portion of the incident light L41' that is diffused downward and passes through the bottom surface 401b of the light guide plate 401 can be reflected by the first region 402A of the reflector 102 to form a reflected light L41r returning to the light guide plate 401, and the reflected light L41r then exits outward through the output surface 401a to form part of the backlight of the keyboard backlight module 400. The incident light L42 emitted by the light-emitting device 403b can come into the light guide plate 401 through the sidewall 401f of the opening 401d and propagate inside the light guide plate 401 by total internal reflection. When the incident light L42 is projected to each of the light-guiding dots 401c, the conditions of refraction can no longer be satisfied, thereby the incident light L41 cab be diffused to various angles. Wherein, a portion of the incident light L42' that is diffused downward and passes through the bottom surface 401b of the light guide plate 401 can be reflected by the second region 402B of the reflector 102 to form a reflected light L42r returning to the light guide plate 401, and the reflected light L42r then exits outward through the output surface 401a to form part of the backlight of the keyboard backlight module 400.

The microstructure 404 covers the reflecting surface 102c of the reflector 102 and overlaps at least a portion of the light-guiding dots 401c of the light guide plate 401. In the present embodiment, the microstructure 404 can be a light-absorbing feature both cover the first region 402A and the second region 402B of the reflecting surface 102c of the reflector 102 to block or absorb the portion of the incident light L41' and L42' diffused downward and passing through the bottom surface 401b of the light guide plate 401, so as to reduce the reflected light L41r and L42r reflected by the reflector 102 retuning to the light guide plate 401. The distribution density and coverage area of the microstructures 404 in the first area 402A and the second area 402B can be adjusted according to the aforementioned method for improving the backlight uniformity of the keyboard backlight module 400. For example, a densely distributed microstructure 404 is disposed on the region of the reflecting surface 102c closer to the light-emitting devices 403. Since the adjusting method has bee described above, thus it will not be redundantly repeated here. By the blocking or absorption of the microstructure 404, a portion of the incident light L41' and L42' diffused downward through the bottom surface 401b of the light guide plate 401 can be prevented from being reflected by the first region 402A and the second region 402B of the reflecting surfaces 402c to form the reflected light L41r and L42r, such that the backlight passing through the output surface 101a of the light guide plate 101 to exit outward can be reduced. The intensity of the backlight respectively emitted outward from the regions of the output surface 401a corresponding to the first region 402A and the second region 402B can be adjusted or reallocated to achieve the purpose of improving the problem of uneven light output of the keyboard backlight module 400.

Figure 5:
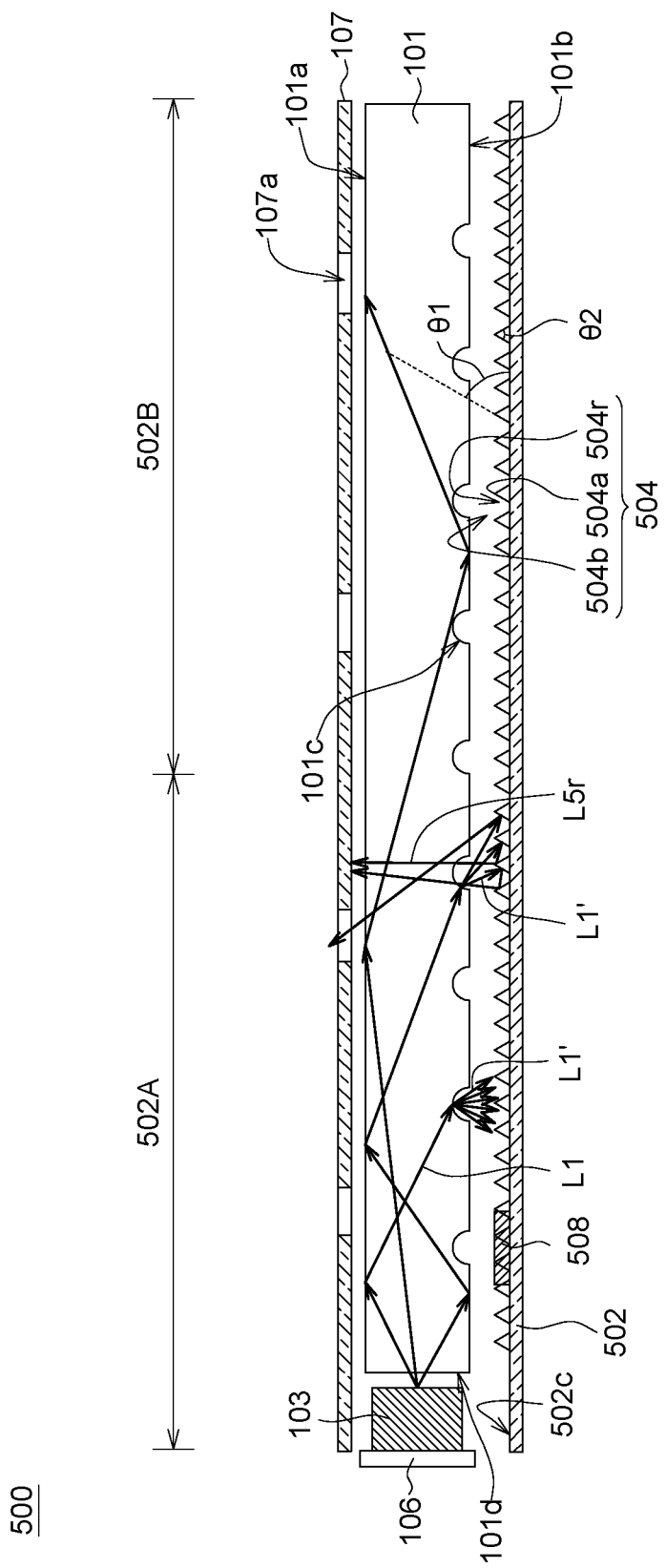
FIG. 5 is a cross-sectional view illustrating the structure a keyboard backlight module according to further embodiment of the present disclosure.

FIG. 5 is a cross-sectional view illustrating the structure a keyboard backlight module 500 according to further embodiment of the present disclosure. The structure of the keyboard backlight module 500 is substantially similar as that of the keyboard backlight module 100, except that the keyboard backlight module 500 has a different arrangement in the microstructure 504.

In the present embodiment, the microstructure 504 can be a concave/convex pattern, which is disposed on the reflecting surface 502c of the reflector 502 and overlaps at least a portion of the light-guiding dots 101c of the light guide plate 101. The microstructure 504 is, for example, a micro-prism protruding from the reflecting surface 502c of the reflector 502. The microstructure 504 has at least one reflective surface 504r facing the light-emitting devices 103, and the reflective surface 504r and the reflecting surface 502c of the reflector 502 form an angle Θ1 of less than or equal to 90°.

In detail, the microstructure 504 includes at least one protruding portion 504a, such as a bar-shaped wedge, a pyramid, or a hairline structure, convexly protruding from the reflecting surface 502c. Taking wedge-shaped stripe structures as an example of the protruding portion 504a, each of the wedge-shaped stripe structure (protruding portion 504a) has a triangular or trapezoid-shaped cross-sectional profile, by which a plurality of trenches 504b (formed between two adjacent wedge-shaped stripe structures) can be defined on the reflecting surface 502c of the reflector 502. Wherein, the inclined sidewall of the wedge-shaped strip structures (protruding portion 504a) can serve as the reflective surface 504r, and it can form the angle Θ1 less than or equal to 90° with the reflecting surface 502c. In other words, the reflective surface 504r is also a sidewall of the trenches 504b. In the present embodiment, the protruding portion 504a of the microstructure 504 has a triangular cross-sectional profile; and this triangular cross-sectional profile has an apex angle Θ2 away from the reflecting surface 502c and between 87° and 93°.

After the incident light L1 emitted by the light-emitting devices 103 is projected to each light guide point 101c, the portion incident light L1' that is diffused downward and passes through the bottom surface 101b of the light guide plate 101 to the reflector 502be can be reflected by the reflector 502 to form the reflected light L5r returning to the light guide plate 101. The reflected light L5r is then projected outward passing through the output surface 101a of the light guide plate 101 to serve as a portion of the backlight of the keyboard backlight module 500. By providing the microstructure 504 on the reflecting surface 502c of the reflector 502, the protruding portion 504a can be used to adjust the reflection direction of the portion of the incident light L1' that is diffused downward through the bottom surface 101b of the light guide plate 101. Thereby, the reflected light L5r has directivity; and the amount of light emitted by the keyboard backlight module 500 and perpendicular to the keycap surface can be increased to improve the performance of the backlit keyboard applying the keyboard backlight module 500.

In addition, by adjusting the angle Θ1, the reflection angle of the reflected light L5r can be changed. For example, by adjusting the angle Θ1 to be greater than 45°, the reflected light L5r can be mainly shifted away from the direction perpendicular to the output surface 101a of the light guide plate 101, thereby the amount of the reflected light L5r passing through the output surface 101a can be reduced, and the backlight intensity of the keyboard backlight module 500 is the decreased. Alternatively, by adjusting the angle Θ1 to be less than 45° allows the reflected light L5r to be mainly directed toward the direction perpendicular to the output surface 101a of the light guide plate 101, thereby the amount of the reflected light L5r passing through the output surface 101a can be increased; and the backlight intensity of the keyboard backlight module 500 can be thus also increased.

The distance between the first region 502A and the light-emitting devise 103 is smaller than the distance between the second region 502B and the light-emitting devices 103. Those skilled in the art can adjust the distribution density of the microstructures 504 in the first region 502A and the second region 502B according to the actual light emitting state of keyboard backlight module 500 to further change the intensity of the light L5r emitted outward from different positions of the light guide plate 101 corresponding to the first region 502A and the second region 502B. Therefore, the problem of uneven light output of the keyboard backlight module 500 can be improved. In some other embodiments of the present disclosure, the keyboard backlight module 500 may include at least one light-absorbing material 508 at least partially covering the one of the wedge-shaped stripe structures (protruding portion 504a) of the microstructure 504 or one of the trenches 504b.

Figure 6A:
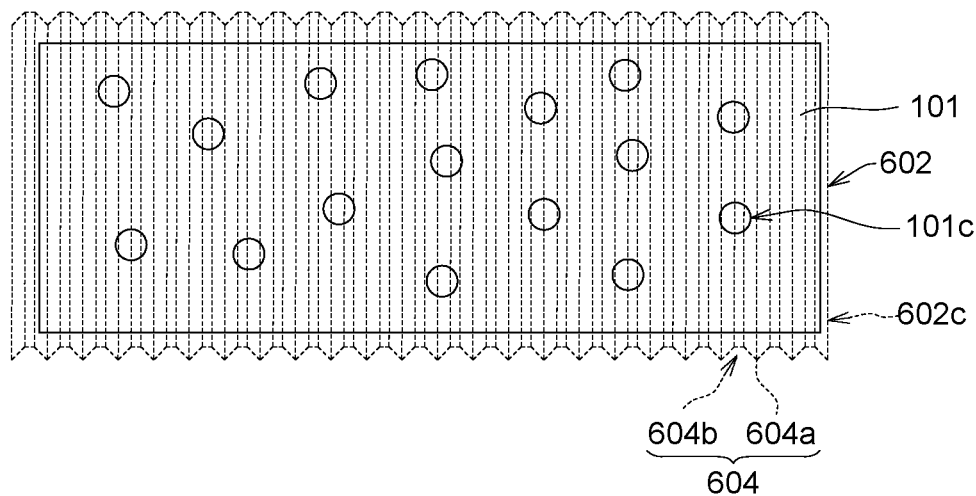
FIGS. 6A-6B are top views illustrating partial structures of a plurality of keyboard backlight modules according to some embodiments of the present disclosure.
Figure 6B:
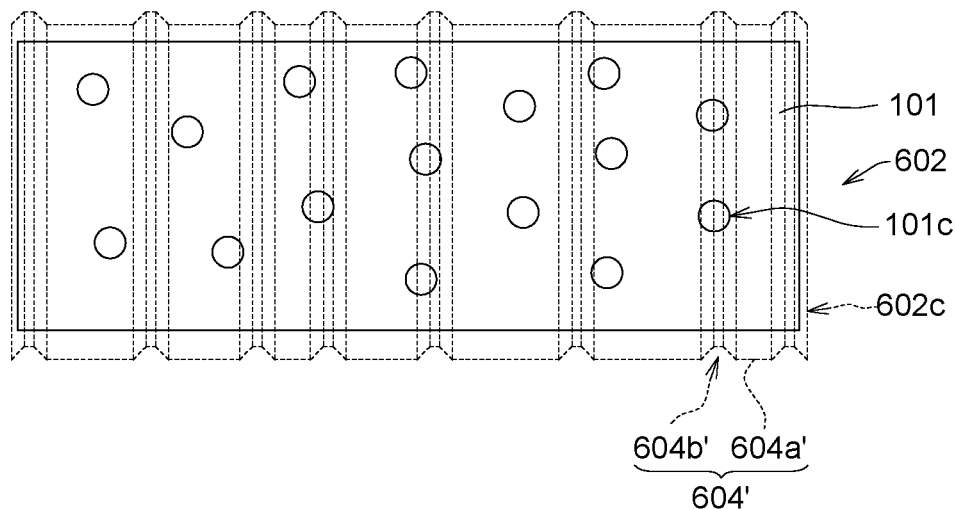

FIGS. 6A-6B are top views illustrating partial structures of a plurality of keyboard backlight modules 600 and 600' according to some embodiments of the present disclosure. For the purpose of clear description, the light-shielding layer 107 and the light-emitting devices 103 are omitted, and only the arrangement and distribution of the microstructures 604 on the reflector 602 and their relative positions with the light-guiding dots 101c of the light guide plate 101 are shown. As shown in FIG. 6A, the light-guiding dots 101c can be circular, and the microstructure 604 is a wedge-shaped stripe or hairline structure 604a; the pitch 604b of the wedge-shaped stripe or hairline 604a is equal; and the number and density of the microstructure 604 may be greater than the number and density of the light-guiding dots 101c. In the microstructure 604' as shown in FIG. 6B, the pitch 604b' and the size of the wedge-shaped stripe or hairline structures 604a' can be different, and the distribution density of the microstructure 604' can be smaller than the number and density of the light-guiding dots 101c.

Figure 7:
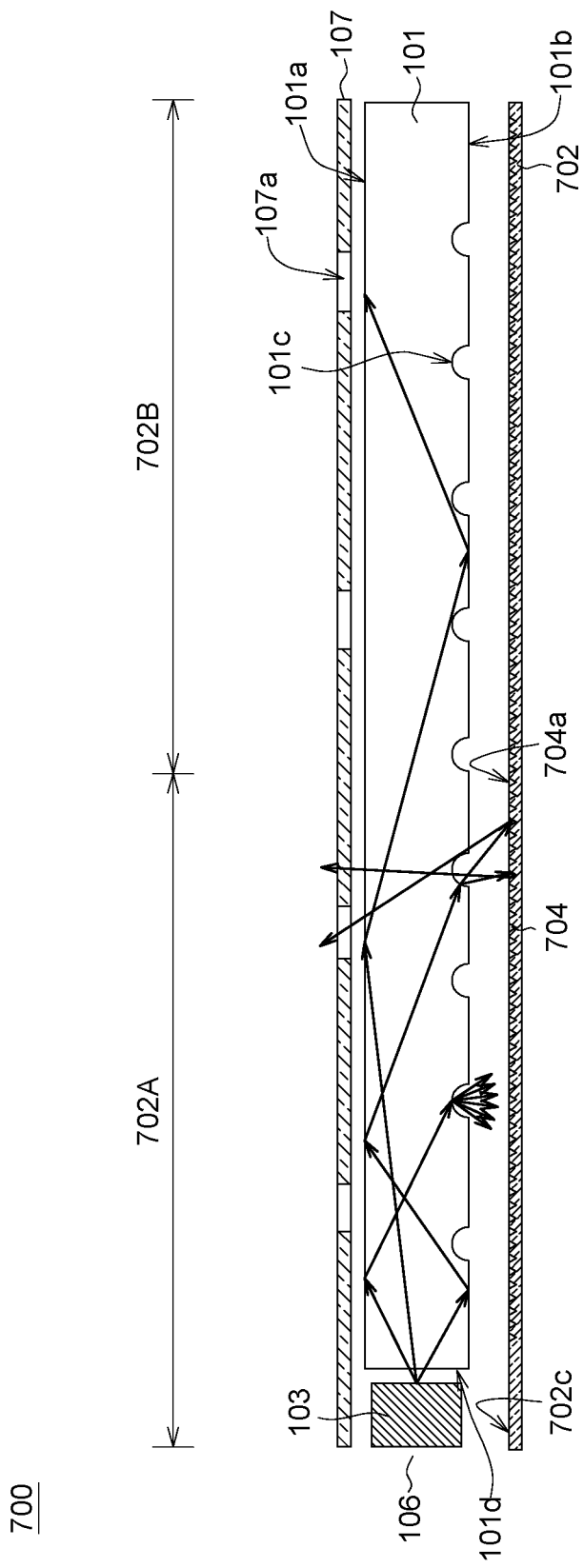
FIG. 7 is a cross-sectional view illustrating the structure a keyboard backlight module according to still another embodiment of the present disclosure.

FIG. 7 is a cross-sectional view illustrating the structure a keyboard backlight module 700 according to still another embodiment of the present disclosure. The structure of the keyboard backlight module 500 is substantially similar as that of the keyboard backlight module 100, except that the keyboard backlight module 700 has a different arrangement in the microstructure 704. In the present embodiment, the microstructure 704 is a microprism pattern concavely recessed on the reflecting surface 702c of the reflector 702. In other words, the microstructure 704 includes a plurality of concave portions 704a recessed inwards the reflector 702 from the reflecting surface 702c, and the microstructure 704 may have at least one reflective surface (not shown) facing the light-emitting devices 103. Since the fabricating method, structure and function of the microstructure 704 are similar to the microstructure 604 of the keyboard backlight module 600 and have been described in detail above, thus they will not be redundantly repeated here.

In another embodiment of the present disclosure, the micro structure of the keyboard backlight module can also be a combination of the above-mentioned concave and convex patterns, that is, the reflecting surface of the reflector can be provided with a pattern convexly protruding from the reflecting surface (such as microstructure 504) and a pattern concavely recessed downward from the reflecting surface (such as microstructure 704).

Figure 8:
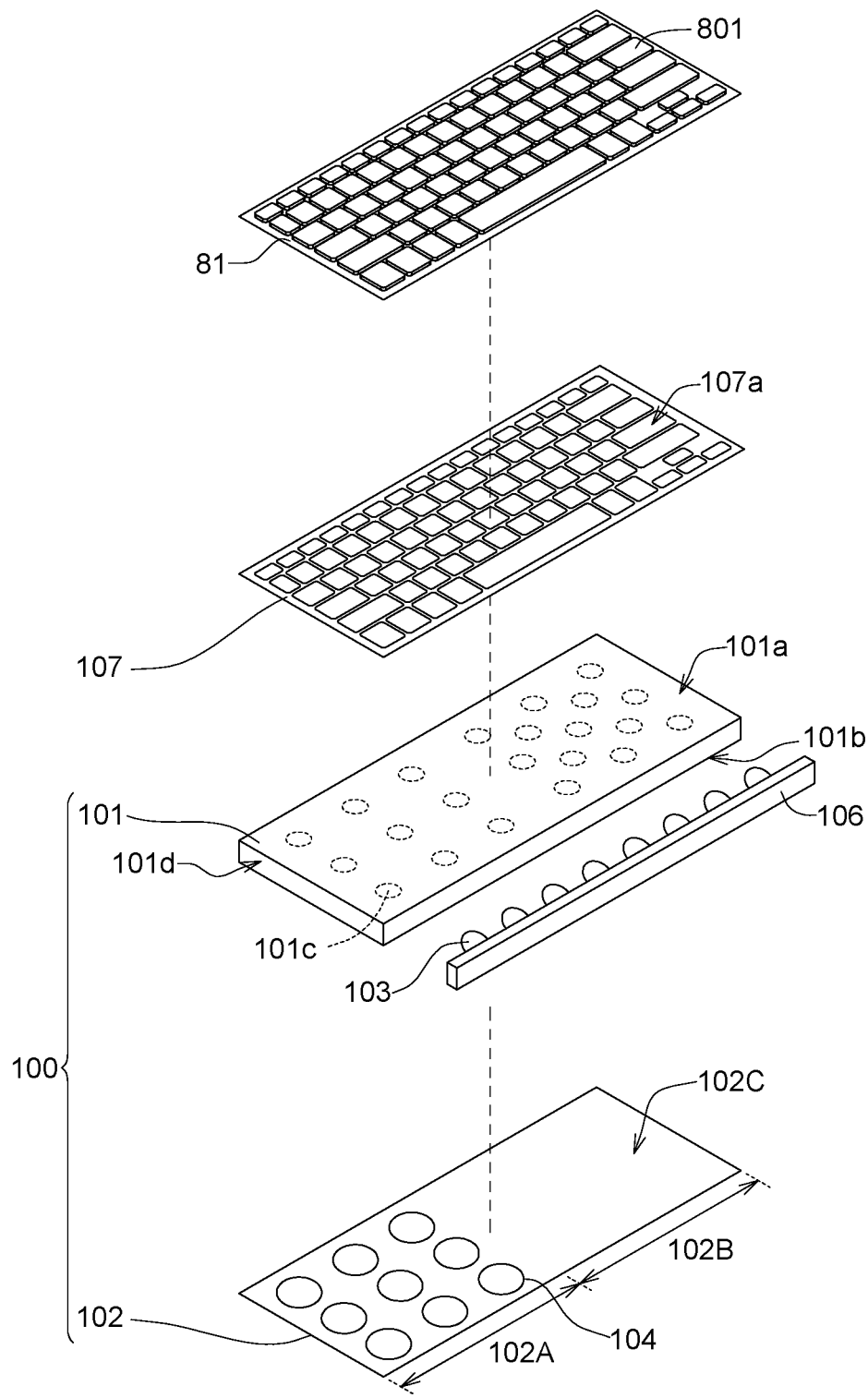
FIG. 8 is a prospective view illustrating the structure of a backlit keyboard applying the keyboard backlight module as described above according to one embodiment of the present disclosure.

FIG. 8 is a prospective view illustrating the structure of a backlit keyboard 80 applying the keyboard backlight module 100 as described above according to one embodiment of the present disclosure. In the present embodiment, the backlit keyboard 80 includes the keyboard backlight module 100 and a key switch module 81. The key switch module 81 is composed of a plurality of key switches 801, disposed on one side of the keyboard backlight module 100, and facing the output surface 101a of the light guide plate 100 of the keyboard backlight module 100.

In accordance with the embodiments of the present disclosure, a keyboard backlight module and a backlit keyboard applying the same are provided, wherein the keyboard backlight module includes a light guide, a reflector and at least one light-emitting device. It is characterized in that at least one microstructure is formed on a reflecting surface of the reflector to make it at least partially overlapping with a light guide pattern disposed on the light guide plate. A portion of the light that is provided by the light-emitting device, passing through the light guide plate and projected to the reflecting surface may be block and absorbed, or changed in the reflection direction by the microstructure, such that the intensity of the reflected light that comes from different regions of the reflecting surface can be adjusted, meanwhile the intensity of backlight that exits through different positions on the output surface of the light guide plate can be changed.

In one embodiment of the present disclosure, the reflecting surface of the reflector can be divided into a first region and a second region with substantially equal areas, and a first microstructure and a second microstructure with different sizes, patterns, materials, colors or structures are formed on these two regions respectively. The incident light emitted by the light-emitting device can be reflected by the first region and the second region to obtain two different kinds of reflected light having different intensities respectively passing through different regions of the output surface of the light guide plate. Thus, after these two different kinds of reflected light mixing with other light emitted from the output surface of the light guide plate, the uneven light emission phenomenon of the light guide plate both occurring on the region (corresponding to the first region) close to the light-emitting device and on the region (corresponding to the second region) far from the light-emitting device can be effectively neutralized. Whereby, the backlight uniformity of the keyboard backlight module can be significantly improved.

In one embodiment of the present disclosure, the first microstructure and the second microstructure may be a light-absorbing feature, and the area covered by the first microstructure is larger than the area covered by the second microstructure. In one embodiment of the present disclosure, the first microstructure and the second microstructure respectively have a reflective surface that can form a first angle and a second angle both less than or equal to 90° with the reflecting surface. Two different kinds of reflected light can be obtained when an incident light is respectively reflected with the first angle and the second angle; and these two different kinds of reflected light have lower intensity when they pass through the output surface of the light guide plate. By applying the above embodiments, the uneven light emission phenomenon of the light guide plate both occurring on the region close to the light-emitting device and on the region far from the light-emitting device can be effectively neutralized; the optical design of the keyboard backlight module can be optimized, and the light emitting uniformity of the keyboard backlight module can be increased. Whereby, the display effect of the backlit keyboard applying the above keyboard backlight module can be improved.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation, so as to encompass all such modifications and similar arrangements and procedures.

What is claimed is:

1. A keyboard backlight module, comprising:
   a light guide plate, having an output surface, a light guide pattern and a bottom surface, wherein the bottom surface is disposed on an opposite side of the output surface, and the light guide pattern is arranged on at least one of the bottom surface and the output surface;
   a light-shielding layer, disposed on the output surface of the light guide plate, wherein the light-shielding layer has a light-shielding portion and a light-transmitting portion;
   a reflector, having a reflecting surface facing the bottom surface;
   a light-emitting device, disposed on one side of the light guide plate and configured to provide an incident light; and
   a first pattern comprising a plurality of first units, disposed on the reflecting surface, and at least partially overlapping with the light-shielding portion, wherein the light guide pattern has a plurality of second units which include at least one light-guiding dot and a single unit of the plurality of first units has an area of a single unit of the at least one light-guiding dot located directly above the single unit of the plurality of first units.

2. The keyboard backlight module according to claim 1, wherein the reflecting surface has a first region and a second region, a distance between the first region and the light-emitting element is smaller than a distance between the second region and the light-emitting element; and a portion of the first pattern disposed in the first region has a configuration different from that of another portion of the first pattern disposed in the second region.

3. The keyboard backlight module according to claim 1, wherein the first pattern is a light-absorbing feature, the reflecting surface has a first region and a second region with substantially equal areas, the first region is closer to the light-emitting device than the second region, and a first area occupied by a portion of the first pattern disposed in the first region is larger than a second area occupied by another portion of the first pattern disposed in the second region.

4. The keyboard backlight module according to claim 1, wherein the first pattern has at least one first reflective surface facing the light-emitting device;
   and the at least one first reflective surface and the reflecting surface form a first angle less than or equal to 90°.

5. The keyboard backlight module according to claim 4, wherein the reflecting surface has a first region and a second region with substantially equal areas, the first region is closer to the light-emitting device than the second region, a first number of the first reflective surfaces are disposed in the first region, a second number of the first reflecting surfaces are disposed in the second region, and the first number is smaller than the second number.

6. The keyboard backlight module according to claim 5, wherein the light guide pattern has a first number of one or more light-guiding dots of the at least one light-guiding dot corresponding to the first region and a second number of one or more light-guiding dots of the at least one light-guiding dot corresponding to the second region, and the first number is smaller than the second number.

7. The keyboard backlight module according to claim 4, further comprising a second pattern configured to transform another portion of the incident light into a second reflected light, wherein the reflecting surface has a first region and a second region with substantially equal areas; the first region is closer to the light-emitting device than the second region; the first pattern is disposed in the first region and the second pattern is disposed in the second region; the second pattern has at least one second reflective surface facing the light-emitting device, and the at least one second reflective surface and the reflecting surface form a second angle smaller than the first angle.

8. The keyboard backlight module according to claim 7, wherein the light guide pattern has a first number of one or more light-guiding dots of the at least one light-guiding dot corresponding to the first region and a second number of one or more light-guiding dots of the at least one light-guiding dot corresponding to the second region, and the first number is smaller than the second number.

9. The keyboard backlight module according to claim 1, further comprising a second pattern configured to transform another portion of the incident light into a second reflected light, wherein the reflecting surface has a first region and a second region with substantially equal areas; the first region is closer to the light-emitting device than the second region; the first pattern is disposed in the first region and has a first light-shielding area; and the second pattern is disposed in the second region and has a second light-shielding area smaller than the first light-shielding area.

10. The keyboard backlight module according to claim 9, wherein the light guide pattern has a first number of one or more light-guiding dots of the at least one light-guiding dot corresponding to the first region and a second number of one or more light-guiding dots of the at least one light-guiding dot corresponding to the second region, and the first number is smaller than the second number.

11. The keyboard backlight module according to claim 1, wherein the first pattern includes at least one protruding portion convexly protruding outwards from the reflecting surface, or at least one concave portion concavely recessed inwards to the reflector from the reflecting surface.

12. The keyboard backlight module according to claim 11, further comprising at least one light-absorbing material at least partially overlapping the at least one protruding portion or the at least one concave portion.

13. The backlit keyboard according to claim 1, wherein the light-emitting device is disposed at a position corresponding to the light-shielding portion of the light-shielding layer.

14. A backlit keyboard, comprising:
a key switch module, comprising at least one key switch; and
a keyboard backlight module disposed on one side of the key switch module, comprising:
a light guide plate, having an output surface, a light guide pattern and a bottom surface,
wherein the bottom surface is disposed on an opposite side of the output surface, and the light guide pattern is arranged on at least one of the bottom surface and the output surface;
a reflector, having a reflecting surface facing the bottom surface;
a light-emitting device, disposed on one side of the light guide plate; and
a first pattern comprising a light-absorbing feature, disposed on the reflecting surface,
wherein the reflecting surface comprises a first region and a second region with substantially equal areas, the first region is closer to the light-emitting device than the second region, and a first area occupied by the light-absorbing feature in the first region is different from a second area occupied the light absorbing feature in the second region.

15. The backlit keyboard according to claim 14, wherein a portion of the light guide pattern and a portion of the first pattern are correspondingly arranged below the at least one key switch.

16. The backlit keyboard according to claim 14, wherein the reflecting surface has a first region and a second region, a distance between the first region and the light-emitting element is smaller than a distance between the second region and the light-emitting element; and a portion of the first pattern disposed in the first region has a configuration different from that of another portion of the first pattern disposed in the second region.

17. The backlit keyboard according to claim 14, wherein the first area occupied by the light-absorbing feature is larger than the second area occupied by the light-absorbing feature.

18. The backlit keyboard according to claim 14, wherein the first pattern has at least one first reflective surface facing the light-emitting device; and the at least one first reflective surface and the reflecting surface form a first angle less than or equal to 90°.

19. The backlit keyboard according to claim 18, wherein the reflecting surface has a first region and a second region with substantially equal areas, the first region is closer to the light-emitting device than the second region, a first number of the first reflective surfaces are disposed in the first region, a second number of the first reflective surfaces are disposed in the second region, and the first number is smaller than the second number.

20. The backlit keyboard according to claim 14, further comprising a second pattern, wherein the reflecting surface has a first region and a second region with substantially equal areas; the first region is closer to the light-emitting device than the second region; the first pattern is disposed in the first region and has a first light-shielding area; and the second pattern is disposed in the second region and has a second light-shielding area smaller than the first light-shielding area.

21. The backlit keyboard according to claim 14, further comprising a light-shielding layer disposed on the output surface of the light guide plate,
wherein the light-shielding layer has a light-shielding portion and a light-transmitting portion, and the first pattern partially overlaps with the light-shielding portion.

* * * * *